(12) United States Patent
Farenden

(10) Patent No.: US 6,575,270 B2
(45) Date of Patent: Jun. 10, 2003

(54) METHOD AND DEVICE HANDBRAKE SETTING

(75) Inventor: Steven Farenden, Macedon (AU)

(73) Assignee: Sarlyn Pty. Ltd. (AU)

( * ) Notice: Subject to any disclaimer, the term of this patent is extended or adjusted under 35 U.S.C. 154(b) by 0 days.

(21) Appl. No.: 09/983,192

(22) Filed: Oct. 23, 2001

(65) Prior Publication Data

US 2002/0070083 A1 Jun. 13, 2002

Related U.S. Application Data

(63) Continuation of application No. PCT/AU00/00348, filed on Apr. 20, 2000.

(30) Foreign Application Priority Data

Apr. 23, 1999 (AU) .............................. PP9979

(51) Int. Cl.⁷ ................................ B60T 1/00
(52) U.S. Cl. ................... 188/2 D; 74/501.5 R
(58) Field of Search ............ 188/2 D; 74/500.5–502.6, 74/510, 511 R

(56) References Cited

U.S. PATENT DOCUMENTS

| | | | |
|---|---|---|---|
| 4,548,093 A | * 10/1985 | Nomura | 74/512 |
| 4,914,971 A | 4/1990 | Hinkens et al. | |
| 5,528,957 A | * 6/1996 | Belmond | 74/538 |

FOREIGN PATENT DOCUMENTS

| | | |
|---|---|---|
| DE | 4218816 A1 | 12/1993 |
| JP | 10138890 A | 5/1998 |
| JP | 11093937 A | 4/1999 |

OTHER PUBLICATIONS

Copy of International Search Report for International Application No. PCT/AU 00/00348 dated May 8, 2000.

* cited by examiner

*Primary Examiner*—Jack Lavinder
*Assistant Examiner*—C. T. Bartz
(74) *Attorney, Agent, or Firm*—Finnegan, Henderson, Farabow, Garrett & Dunner

(57) ABSTRACT

A device for setting the handbrake cable (26) of an automotive handbrake, said handbrake cable (26) including a threaded member (27) fixed at one end and a nut (28) threaded onto said threaded member (27) and in the set condition of the handbrake said nut (28) engaging against a seat (29) to maintain tension in said handbrake cable (26), said device including gripping means (69) to grip said threaded member (27) and retracting means (48, 49) to retract said gripping means (69) to a retracted position to apply a tensile bedding load to said cable (26) which bedding load exceeds the required set load of the cable (26) in the set condition, return means (48, 49) to return said threaded member (27) from said retracted position to reduce the tensile load on said cable (26) to said set load, rotating means (20, 60) to rotate said nut (28) down said threaded member (27) to engage said seat (29) whereafter said gripping means (69) releases said threaded member (27).

16 Claims, 10 Drawing Sheets

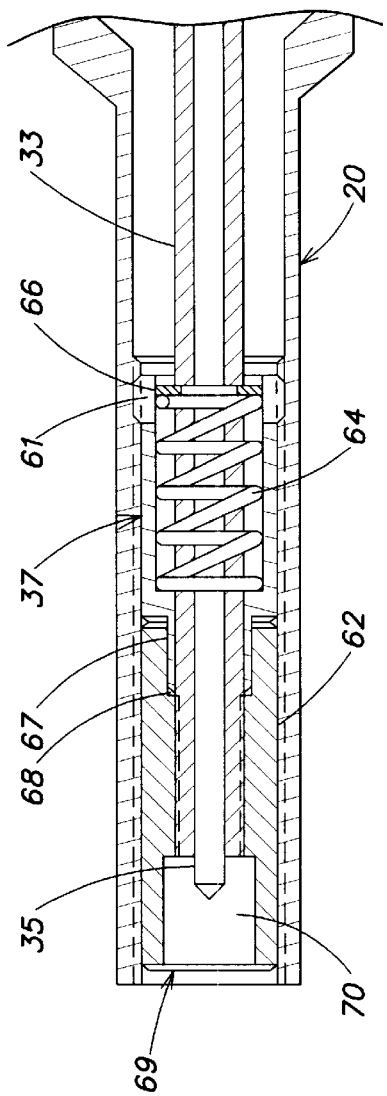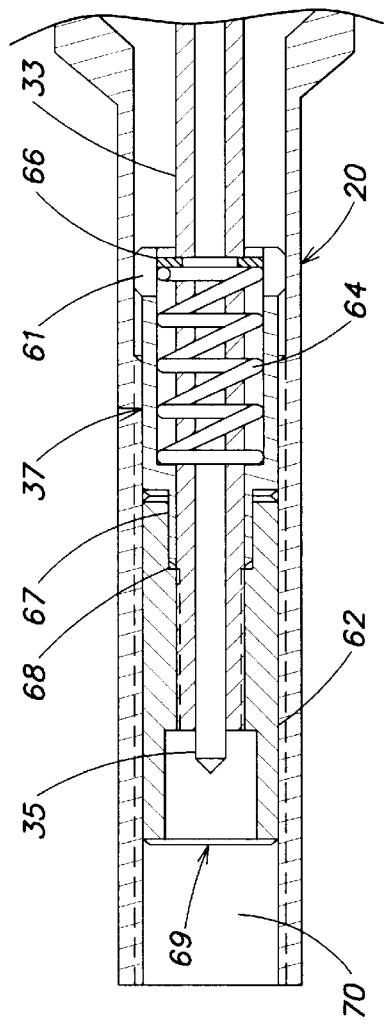
FIG. 4B
FIG. 4C

METHOD AND DEVICE HANDBRAKE SETTING

CROSS REFERENCE TO RELATED APPLICATIONS

This application is a continuation of International Application No. PCT/AU00/00348, filed Apr. 20, 2000, the content of which is incorporated by reference herein, and claims the priority of Australian Application No. PP 9979, filed Apr. 23, 1999.

The present invention relates to a handbrake setting unit for setting the handbrakes of road vehicles, such as cars. The invention relates principally, but not exclusively, to the setting of handbrakes on the production assembly line of such vehicles and it will therefore be convenient to describe the invention in relation to that application. However the invention is not restricted to such use and could have other applications, such as for resetting the handbrake if the handbrake cable is replaced, or disassembled or requires further adjustment.

It is a problem with the handbrake or bowden cable of many new vehicles, that they require slack adjustment of the handbrake cable relatively soon after the vehicle is placed on the road. Slack in the handbrake cable occurs principally due to bedding and seating of components of the handbrake upon initial use of thereof, while cable stretching also contributes to the slack generated.

The tensioning of a handbrake cable on a production line to operating tension is known as "handbrake setting" and it would be preferable if the handbrake setting procedure was such as to avoid the need for early handbrake adjustment. This is desirable, because the requirement for early adjustment of the handbrake is not only inconvenient, but because most vehicle manufacturers provide free of charge at least the first post sale scheduled service, the cost of resetting the handbrake is normally a cost which must be absorbed by the manufacturer. Due to the high volume of vehicles requiring resetting, some manufacturers are therefore exposed to a significant and wasteful expense.

It has been found that applying a load to the handbrake cable of an assembled handbrake in the production line has benefit in bedding and seating the components of the handbrake. It has therefore been known to apply a tensile load to the handbrake cable during setting and in one form, the load has been applied to the handbrake cable through the handbrake adjuster nut. The handbrake is positioned in the applied position and a torque driver, fitted with a socket is positioned onto the handbrake adjuster nut. The driver is activated to rotate in a clockwise direction which in turn revolves the socket and the adjuster nut. In this method, the nut sits on the handbrake and it can therefore not move down the adjuster thread. As the nut is turned, the handbrake adjuster rises through the nut and as a result, tension increases within the handbrake cable. Consequently, the torque required to rotate the adjuster nut increases as tension in the handbrake cable increases. The torque driver stops rotating when the torque required to rotate the adjuster nut rises to that of the predetermined torque driver setting. This torque driver method, uses the adjuster nut to apply and maintain the tensile load applied to the handbrake cable. In practice, the load generated by the torque driver can vary with variation in the interference between the nut and the adjuster thread and that can result in a substantial variation from the load required to be applied to the cable. In particular, the load can be below that which is required. This process has thus been found to be very inconsistent and therefore has not found wide use.

It is an object of the present invention to overcome or at least alleviate the disadvantages of the prior art. It is a further object of the invention to provide a method of setting a handbrake such as to significantly delay the need for handbrake adjustment when use of the handbrake commences. It is still a further object of the invention to provide a method by which the components of a handbrake assembly can be caused to substantially fully bed and seat during installation or setting of the handbrake. It is another object of the invention to provide a device for setting a handbrake to achieve one or more of the above mentioned objects.

According to the present invention there is provided method of setting the handbrake cable of an automotive handbrake, said handbrake cable including a threaded member fixed at one end and a nut threaded onto said member and in the set condition of the handbrake said nut engaging against a seat to maintain tension in said handbrake cable, said method including gripping said threaded member and retracting said member to apply a tensile bedding load to said cable, which bedding load exceeds the required set load of the cable in the set condition, returning said threaded member from the retracted position to reduce the tensile load on said cable to said set load, rotating said nut down said threaded member to engage said seat and releasing said threaded member.

The method of the invention advantageously causes the handbrake components to bed and the cable to stretch during the cyclic load to a significantly greater and more consistent extent compared with the methods for setting handbrakes, so that the slack generated in the handbrake during early use of the vehicle is significantly reduced and the period by which an adjustment setting is required is, as a consequence, extended.

The invention is particularly more beneficial than the torque drive method described earlier, in that the invention applies and releases cyclically, a dedicated load prior to setting, and that cyclic load application causes the handbrake components to bed and the cable to stretch. In contrast, the torque driver method applies a single load once during setting and the bedding and stretching benefits are negligible or at least very limited. However, that basically is the only known system, and it has continued to be used by some manufacturers in the absence of an alternative solution.

For convenience, hereinafter, the load applied to the handbrake cable will be referred to as the "bedding load". The bedding load is applied at least twice, although preferably it is applied and released, or "cycled", a plurality of times and the number of applications will depend on the characteristics of the handbrake being set. It is preferable that at least four bedding load cycles be applied to the handbrake, although additional cycles, taking the total number to perhaps six or eight, could equally be applied. Generally, the limiting factor in relation to the number of applied cycles, is the time allowable for such a procedure in the production line. It is envisaged that a cycle time of approximately 10–15 seconds will typically be available, to apply the bedding load or cycled bedding loads of the invention.

Preferably the bedding load applied to the handbrake cable exceeds the operating tensile load that would normally be applied to the cable under ordinary operating conditions of the handbrake. Preferably the bedding load exceeds the ordinary operating load by a reasonable amount in order to realise the advantages of the invention and preferably the difference between the bedding and the ordinary operating loads is in the order of approximately 100%, although the load should not exceed the designed abuse load of the handbrake system. In theory, a sufficiently large bedding load could bed, seat, compress and stretch all the relevant components of the handbrake sufficiently to extend the first service interval of the handbrake to a period equal to subsequent service intervals.

The difference between the bedding load and the ordinary operating load may be subject to the number of cycles applied to the handbrake, such that with a greater number of cycles, the bedding load could be reduced. However it must be appreciated that a limitless number of light loads will not, for example, pre-stretch the handbrake cable beyond a certain length. The only way that can be done is to apply a greater load. Conversely, a higher bedding load may require a reduced number of cycles to achieve the same level of handbrake bedding.

The method of the invention can be carried out in any suitable manner, and in one embodiment, the method involves gripping the handbrake cable with gripping means at, or in the region of the cable adjuster thread, and retracting the gripping means to apply a tensile bedding load to the cable. The load can be released by releasing the gripping means from the cable, but in a preferred manner, the gripping means remains in gripping engagement with the cable and is returned from the retracted position to release or substantially reduce the bedding load. Advantageously, the gripping means may grip the handbrake cable by threadably engaging the adjuster thread.

The invention further extends a device for setting the handbrake cable of an automotive handbrake, said handbrake cable including a threaded member fixed at one end and a nut threaded onto said member and in the set condition of the handbrake said nut engaging against a seat to maintain tension in said handbrake cable, said device including gripping means to grip said threaded member and retracting means to retract said gripping means to a retracted position to apply a tensile bedding load to said cable which bedding load exceeds the required set load of the cable in the set condition, return means to return said threaded member from said retracted position to reduce the tensile load on said cable to said set load, rotating means to rotate said nut down said threaded member to engage said seat whereafter said gripping means is arranged to release said threaded member.

Preferably the gripping means includes a threaded portion, such as a sleeve or recess for threadably engaging the adjuster thread. Preferably the threaded portion is rotatable so that it can be threaded on to the adjustor thread and preferably the device includes drive means operable to rotatably drive the threaded portion into threaded engagement with the adjuster thread. In one form of the invention, the drive means is operable to drive a socket member which houses the threaded portion. In this form of the invention, the drive means preferably is reversible to allow the threaded portion to be driven on to and off the adjuster thread. The drive means preferably is electric or pneumatic, although other types of drive could also be adopted.

The gripping means can be retracted to apply a tensile bedding load to the handbrake cable in any suitable manner and in one form of the device of the invention, the retracting means includes a piston/cylinder arrangement. A single piston within a cylinder can be employed for this purpose although in a preferred arrangement, a pair of pistons which are connected in series are employed to increase the output of the retracting means. The retracting means could alternatively be an electric motor and rack. Advantageously in either arrangement, the device can be assembled as a handheld device and still provide the load output required.

In an arrangement which employs retracting means having a piston or pistons, the threaded portion can be connected to a drawbar extending from the or one of the pistons and retracting movement of the threaded portion occurs upon retracting movement of the or each piston. In such an arrangement, movement of the piston(s) in the reverse direction causes the threaded portion to return partially or fully from the retracted position. Alternative means to return the threaded portion from the retracted position could however, be employed.

Preferably drive of the threaded portion can be controlled automatically, so that when the adjuster thread is properly engaged by the threaded portion, drive thereof is discontinued. Sensing means can be adopted for this purpose and in one arrangement, the depth of threaded engagement of the adjustable thread by the threaded portion is sensed. That sensing means operates when the device is first applied to the adjustable thread and preferably it controls the drive means that drives the socket, so that upon full threaded engagement between the threaded portion and adjuster thread, the drive means is temporarily de-activated.

Sensing means can also be applied to the piston movement to sense the value of the load being applied, along with the period for which the load is applied. The sensing means could be optical sensors, strain gauges, timers etc.

Rotation of the threaded portion can also be controlled by the use of a drive arrangement which employs a splined section of the socket member to selectively drive a drive member. The drive member has a section, preferably a head at one end thereof, which is configured, preferably hexagonally, for engagement by the splined section and that engagement preferably is dependent on the position of the drive member relative to the socket member. Thus, when the head section is engaged within the splined section, rotation of the socket member causes resultant rotation of the drive member. When the drive member is shifted to disengage the head section from the splined section, rotation of the socket member will cause no rotation of the drive member. The drive member is arranged to selectively, as described above, drive the threaded portion. The threaded portion may be integrally formed as part of the drive member, but preferably it is separately formed and includes engagement means for engaging the drive member. For example, the drive member may include a blade for engagement within a slotted end of the threaded position. That arrangement may permit drive member and the threaded portion to be shifted axially relative to one another, but to rotate together upon rotation of the drive member by the socket member.

The above described arrangement enables the threaded portion to be rotated as necessary, but by displacement of the drive member from engagement with the splined section of the socket, the socket can still be rotated without rotating the threaded portion. This arrangement can be employed advantageously to lower the adjuster nut after the bedding cycle has been completed and the handbrake load is being set. In this arrangement, means are provided to rotate the adjuster nut simultaneously with socket rotation, and in a preferred arrangement the internal splined surface of the socket member engages the head of the nut for rotation thereof. In this arrangement, in one direction of socket rotation, the adjuster thread can be engaged by the threaded portion and the bedding load cycle can then be applied, drawing the adjuster thread and the adjuster nut into the socket and away from the seated position of the nut. When the bedding cycle is complete and the setting load is to be applied, the adjuster thread and nut will remain in, or will again be drawn into the socket, but to a lesser extent than under the bedding load.

The nut will therefore be raised away from its seat and rotation of the socket can be employed to run the nut down the adjuster thread until it is seated without simultaneously rotating the adjuster thread, which would otherwise cause the adjuster thread to be drawn further into the threaded portion until it engaged the closed end thereof, whereafter continued rotation of the adjuster thread could damage the drawbar assembly. The use of the drive arrangement to control rotation of the threaded portion allows for the prevention of such relative movement.

It is preferred that the device of the invention be hand-held for hand operation and the device therefore preferably includes a hand grip. In a preferred embodiment, the drive means is contained within the handgrip and a housing defining the cylinder containing the piston(s) in attached thereto. A casing preferably extends from a forward end of the housing and encloses the socket and related components, such as the gripping means. In this arrangement, the drive means preferably drives the socket through a drive train. The handgrip is preferably offset from perpendicular to the housing by approximately 15 degrees.

The attached drawings show an example embodiment of the invention of the foregoing kind. The particularity of those drawings and the associated description does not supersede the generality of the preceding broad description of the invention.

FIGS. 4A to FIG. 4D are cross sectional views of the drawbar assembly of the device of FIGS. 1, 3 and 4.

Figure 1:
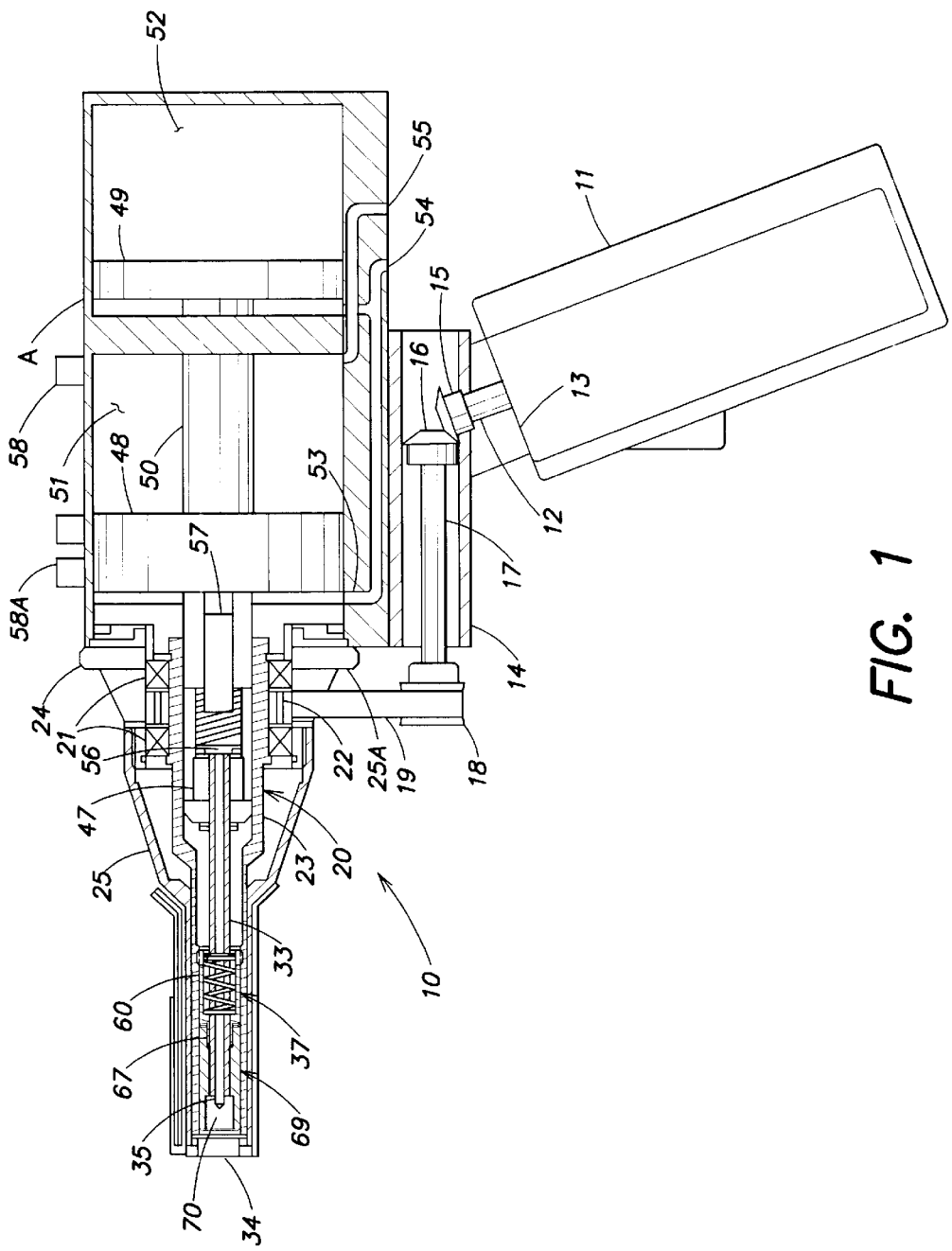
FIG. 1 is a cross-sectional view of a handbrake setting device according to one embodiment of the invention.

FIG. 1 shows an example embodiment of a handbrake setting device according to the invention, showing the device in the "home" or ready to use condition. The device 10 includes a handgrip 11 that houses a pneumatically driven motor (not shown and hereinafter referred to as "the handgrip motor"), for driving a gear shaft 12. A first end 13 of the handgrip 11 is connected to a gearbox 14 by any suitable connection, while the opposite end of the handgrip 11 includes a facility (not shown) for connection to an air hose for the supply of pressurised air to the pneumatic handgrip motor. The handgrip 11 is disposed at an angle to the housing which facilitates ease of manual, hand-held use of the device 10, which is of a similar size to a small electric drill. The angle could be altered as necessary.

The connection of the handgrip 11 to the gearbox 14 is such as to engage the bevel gear 15 attached to the gear shaft 12 with a complementary bevel gear 16, which is connected to a gear shaft 17. The gear shaft 17 is seated within the is gearbox 14 in any suitable manner, such as by bushes or roller bearings, although for convenience, such a seating arrangement is not shown.

The gear shaft 17 extends to and drives a toothed pulley 18 when the pneumatic motor is operating to drive the gear shaft 12. A toothed belt 19 is driven by the pulley 18, which is turn drives, through a toothed connection, a rotatable socket 20. For reasons which will become apparent hereinafter, a portion of the inner surface of the socket 20 has a splined cross-sectional profile. The socket 20 rotates within a pair of bearings 21, between which is a toothed ring or band 22, fixed to or integral with the outer surface 23 of the socket 20 that is driven by the toothed belt 19.

The socket 20 extends from a forward end 24 of a cylinder housing A and itself is housed within a casing 25 that is fixed to the cylinder housing A by an adaptor 25A. While not shown in FIG. 1, a plastic housing can also extend about the pulley 18 and the toothed belt 19, so that those moving parts are enclosed.

Figure 2:
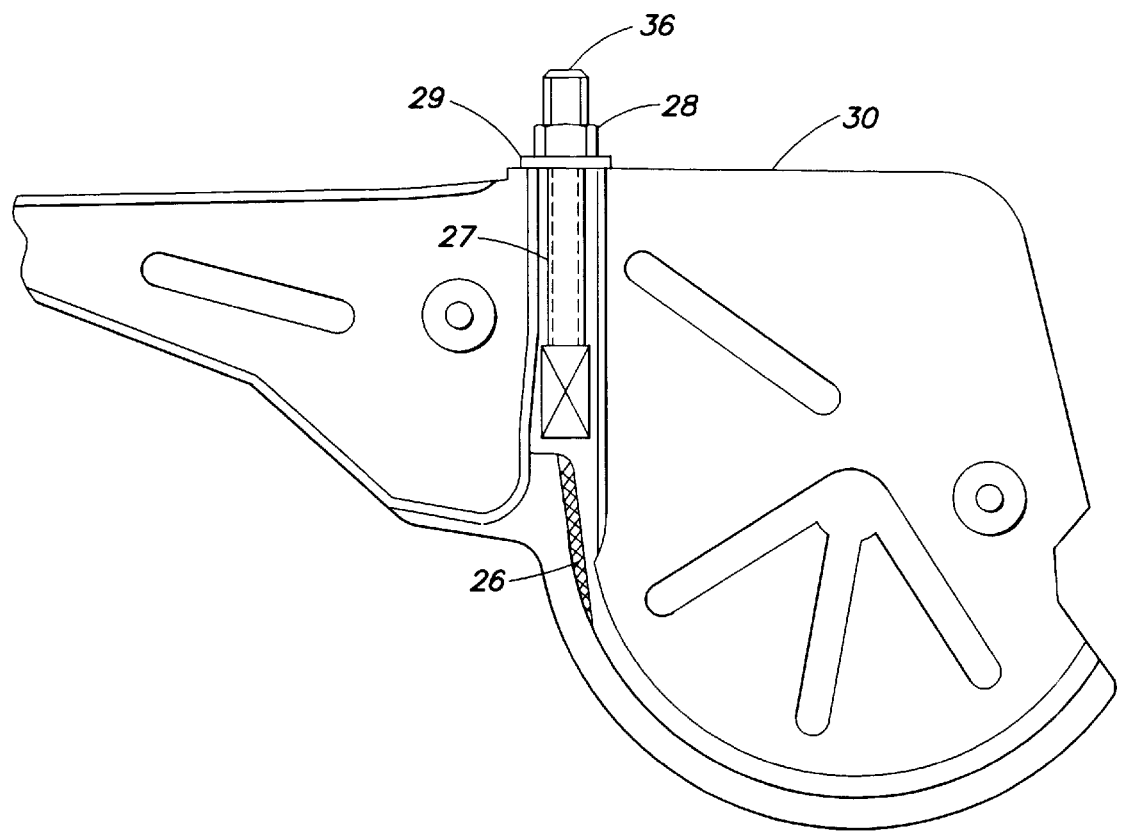
FIG. 2 is a side view of a handbrake which can be set with the device of FIG. 1.

FIG. 2 is a simplified drawing of a common style of handbrake, showing the handbrake cable 26, the adjustor thread 27, which extends from one end of the cable 26, and the adjuster nut 28, which threadably engages the adjuster thread 27. In the position of the handbrake shown, the nut 28 is seated against a washer 29, which is seated against the frame 30 of the handbrake. As can be easily appreciated, slack in the cable 26 can be taken up by rotating the nut 28 relative to the adjuster thread 27, to pull the cable 26 tighter.

The socket 20 drives and encloses gripping means for gripping the adjustor thread 27 of a handbrake cable 26. The gripping means is provided by a thread extending along the inner surface 31 of a recess 70 of a threaded head 69 which is accommodated within the socket 20. The threaded head 69 is fixed to drawbar 33 and the arrangement is described in more detail in FIGS. 4A to 4D. In FIG. 1, the threaded head 69 is shown withdrawn into the socket 20 prior to connection of the handbrake adjuster thread 27 to the threaded recess 70. That is, prior to application of the setting device 10 to the handbrake, the threaded head 69 is positioned toward the distal end 34 of the socket 20. That position of the threaded head 69 is shown in FIG. 3.

Figure 3:
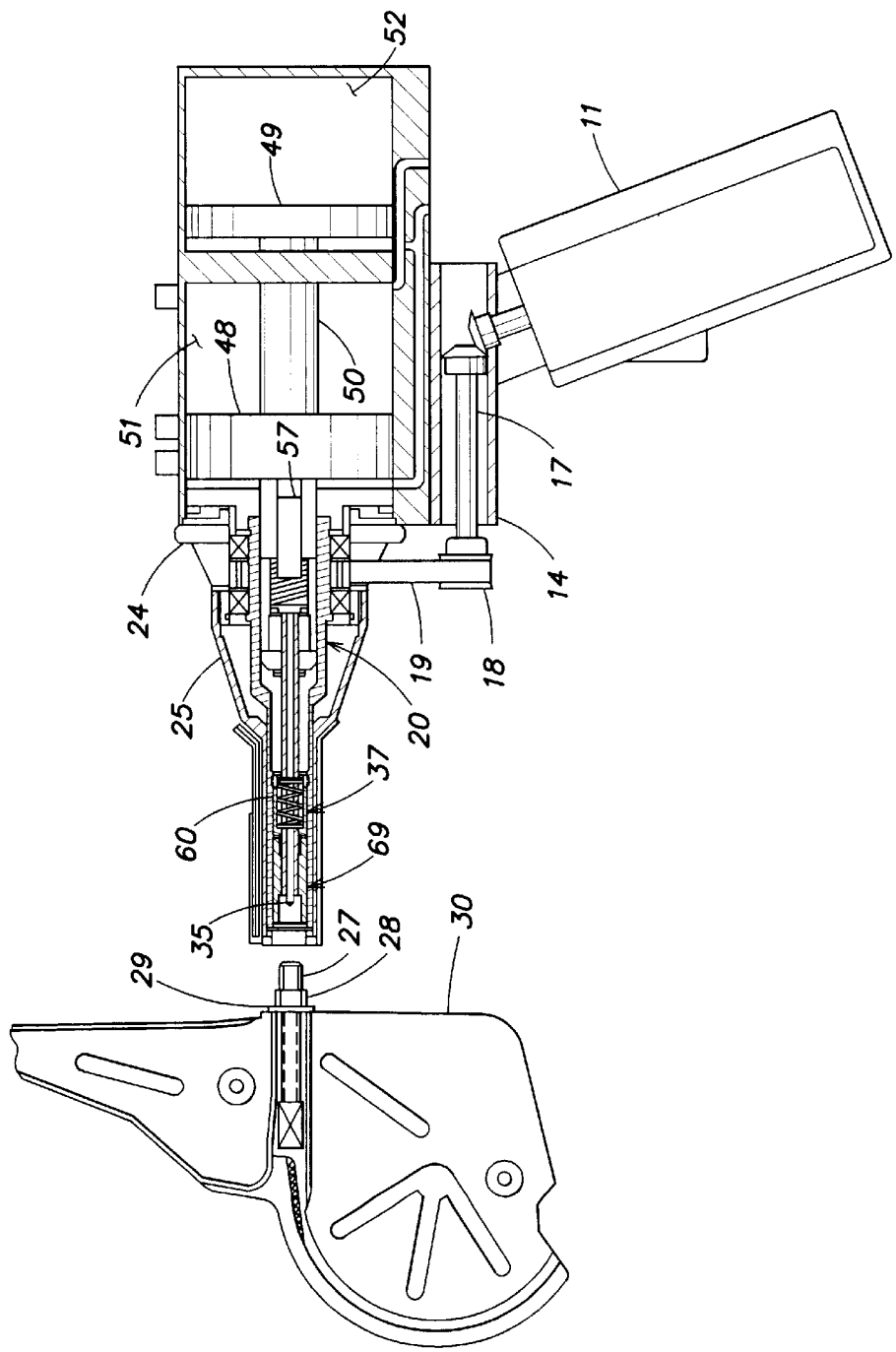
FIG. 3 is a cross-sectional of the device of FIG. 1 being applied to the handbrake of FIG. 2.

A sensor pin 35 extends into the recess 70 as shown in FIGS. 1 and 3. That sensor pin 35 operates to sense when the distal end 36 of the adjustor thread 27 (see FIG. 2) has been fully or sufficiently received within the recess 70 by rotation of the threaded head 69 for gripping of the adjuster thread. The end of the sensor pin 35 remote from the recess 70 includes a head 56 (FIG. 4) and the proximity of that head to a sensor 57 is sensed by the sensor 57. The sensor 57 controls the supply of the air to the handgrip motor, and when the sensor pin 35 is pushed outwardly of the recess 70 a sufficient amount to indicate that the adjuster thread 27 has been threadably engaged within the recess 70, the sensor 57 senses the proximity of the head 56 and causes the supply of air to the handgrip motor to be discontinued. The sensor head 56 can be spring biased to return to its original position when the adjuster thread 27 is released from the recess 70.

Figure 4:
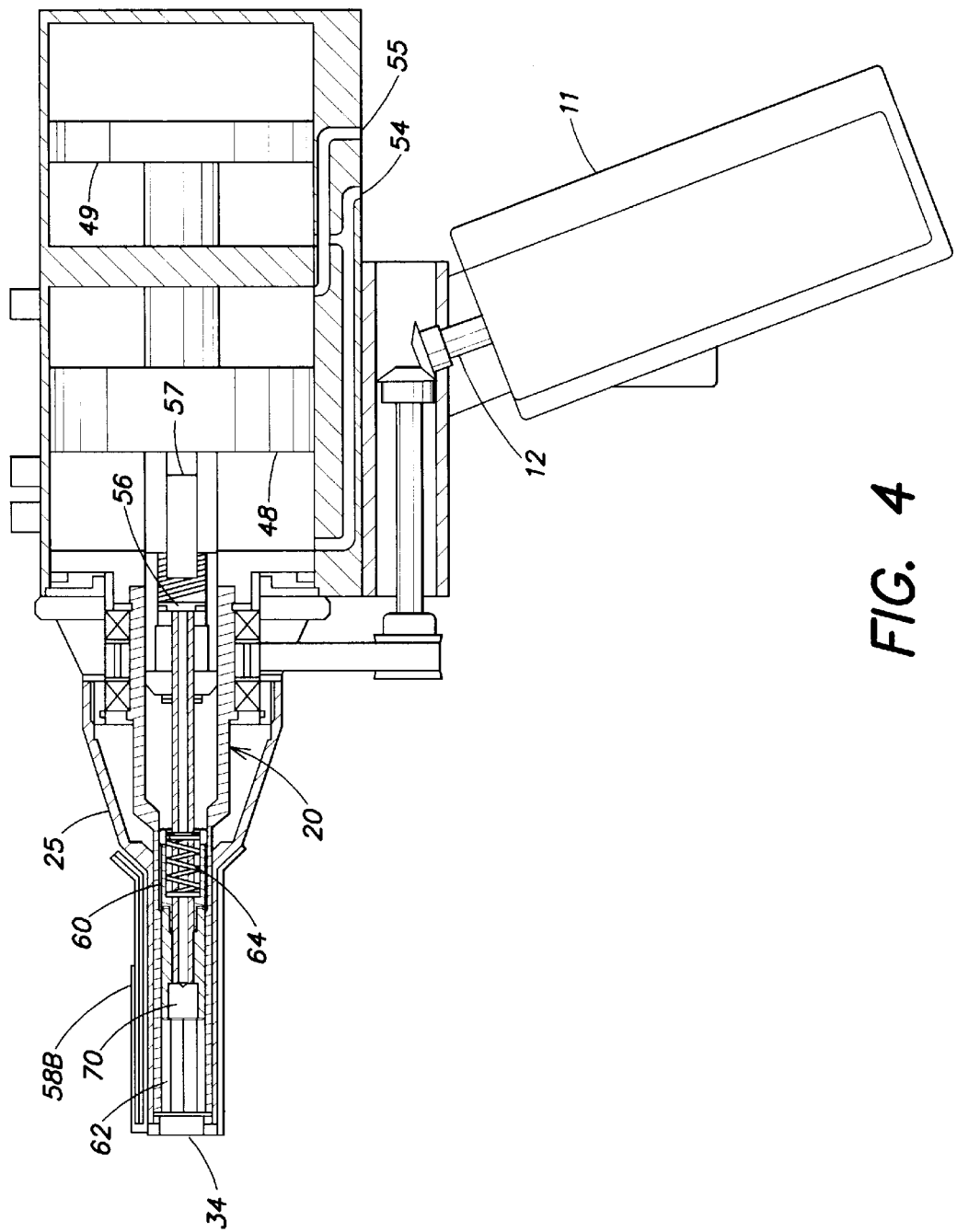
FIG. 4 is a cross-sectional view of the device of FIGS. 1 and 3.
Figure 4A:
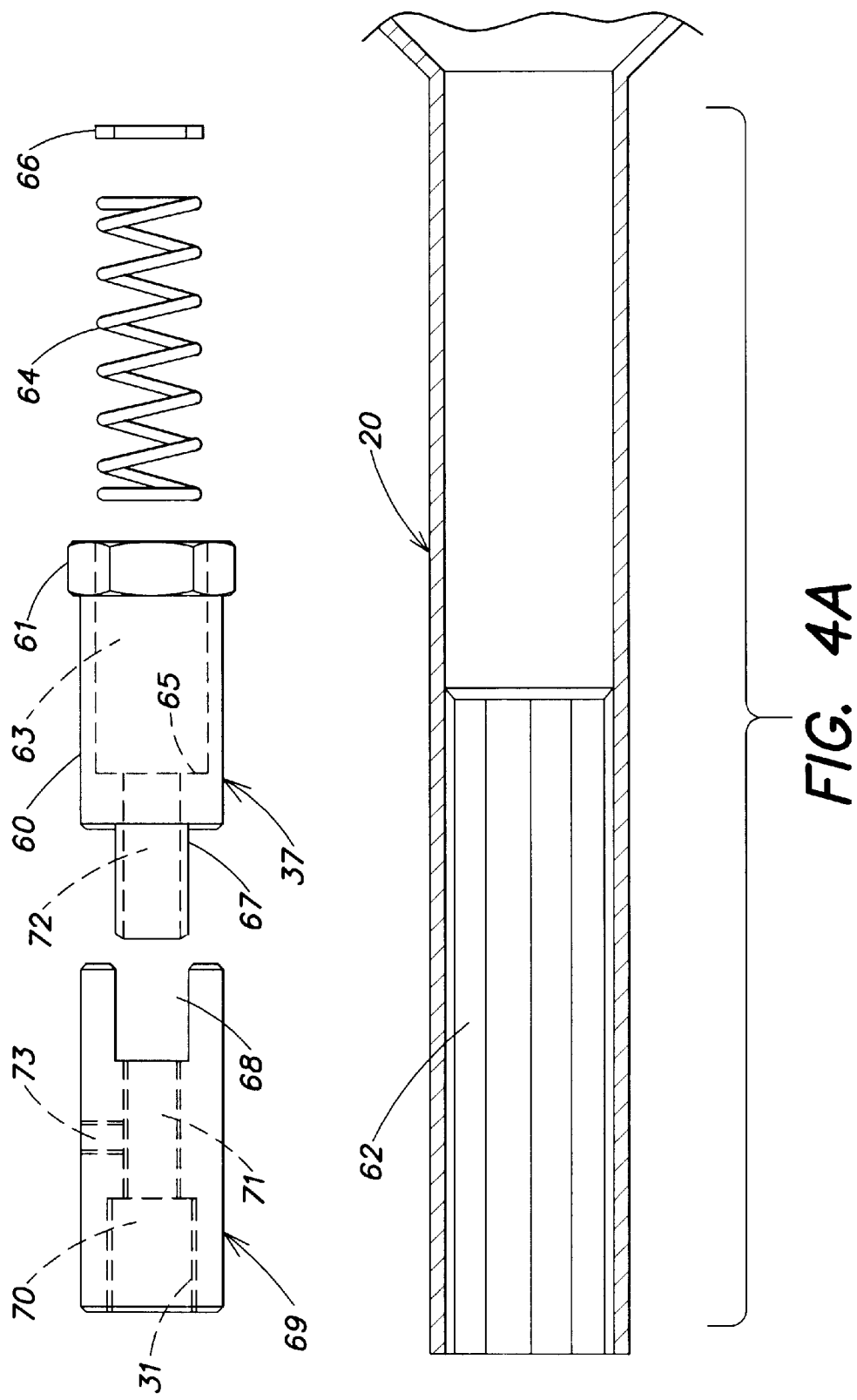

Also located within the socket 20 is a drive arrangement which is shown in larger detail in FIG. 4A. Referring to FIG. 4A, the drive arrangement includes a drive nut 37 which has a major circular portion 60 and a hexagonal head 61. The head 61 fits snugly within the splined section 62 of the socket 20 for driving thereby and can slide relative thereto. The drive nut 37 includes an inner bore 63 to accommodate a return spring 64. The drive nut 37 is a clearance fit about the draw bar 33 (see FIG. 4b) and the return spring 64 locates against the step surface 65 at one end and against a circlip 66 at the other end. The circlip is located in a groove in the drawbar 33. The arrangement is such that when the head 61 of the drive nut 37 is located within the splined section 62, rotation of the socket 20 causes the drive nut 37 to rotate. Conversely, when the head 61 is displaced out of the splined section 62, the socket 20 can rotate without rotating the drive nut 37.

The drive nut 37 includes a blade 67 which is arranged for receipt within a slotted end 68 of a threaded head 69. The threaded head 69 includes a threaded cylindrical recess 70 which is arranged to threadably engage the end of the adjuster thread 27. The threaded head 69 further includes a threaded bore 71 for threadably engaging a threaded end of the drawbar 33. The head 69 further includes a radial bore 73, which is threaded for receipt of a grub screw (not shown) for locking the head 69 relative to the draw bar 33. Thus, the arrangement is such that the threaded head 69 is threadably connected to the draw bar 33, while the drive nut 37 is rotatably connected to the head 69 through the engagement between the blade 67 and the slotted end 68. This connection permits axial sliding movement between the respective drive nut 37 and the head 69. It is to be noted that the drive nut 37 includes a bore 72 which extends through the blade 67, through which the draw bar 33 can extend for threaded connection to the head 69, but the bore 72 is free from engagement with the draw bar 33.

FIG. 4B shows the drive arrangement in a forward position for initial engagement with the end of the adjuster thread 27. In this position, the head 69, is connected to the drive nut 37 by engagement between the blade 67 and the slotted end 68. The hexagonal head 61 is also engaged within the splined section 62 of the socket 20 so that upon rotation of the socket 20, the drive nut 37 will be driven to rotate, and by engagement of the blade 67 in the slotted end 68, the threaded head is also driven to rotate. Additionally, the spring 64, the circlip 66 and the draw bar 33 also rotate.

FIG. 4C shows the drive arrangement with the draw bar 33 withdrawn to apply a tensile load to the handbrake cable through the adjuster thread 27. As shown, the hexagonal head 61 no longer engages within the splined section 62 of the socket 20, so that rotational movement of the socket 20 applies no rotational movement to the drive nut 33 and the threaded head 69. In this position, rotation of the socket can be used to thread the adjuster nut downwardly on the adjuster thread, as described later.

Referring back to FIG. 1, the housing A houses a pair of pistons 48 and 49, connected together in series by a cylindrical shaft 50. The pistons 48 and 49 are located in cylinders 51 and 52 respectively and pneumatic air lines 53 to 55 facilitate ingress and egress of pressurised air into the respective cylinders.

The pistons 48 and 49 move between a forward or "home" position shown in FIGS. 1 and 3, to the retracted or "energised" position shown in FIG. 4. The piston head 47 moves with the pistons 48 and 49, such as to move the drive arrangement of FIG. 4A therewith. That movement can be seen from the abovementioned FIGS. 1, 3 and 4, 4B and 40. As can be seen in FIGS. 1 and 3, the sensor pin 35 extends well into the recess 10.

The operation of the handbrake setting device 10 is as follows. The device 10 commences operation in the home position shown in FIGS. 1 and 3. As shown in that figure, the device 10 is lowered on to the adjustor thread 27 of a handbrake, which could, for example, have been fitted to a vehicle on an assembly production line.

The device commences operation, such as by depressing a button or trigger or the like on the device itself, or by a remote trigger. Alternatively, the device may be automatically operated, such as by appropriate sensors, when the device is lowered on to the adjustor thread.

Whatever means is used to operate the device, once operation has commenced, pressurised air is supplied to the rear side of the piston 48 through the air line 55. This moves the piston 48 and 49, the drawbar 33 and the components associated with the drawbar, to the home position shown in FIGS. 1 and 3. When the home position is reached, the sensor 58A senses the position of the piston 48, afterwhich pressurised air is supplied to the handgrip motor to drive the gearshaft 12, that in-turn drives the gearshaft 17 and the pulley 18. The socket 20 is driven to rotate by the toothed belt 19 and the drive nut 37 is rotationally driven by receipt of the hexagonal head 61 in the splined section 62 of the socket 20. Rotation of the drive nut 37 causes rotation of the threaded head 69 and the drawbar 33, which then threadably engages the end of the adjustor thread 27 to draw the adjuster thread into the threaded recess 70. Air pressure is supplied to the handgrip motor until such time as the sensor pin 35 is moved sufficiently by the end of the adjuster thread for the head 56 of the pin 35 to be sensed by the sensor 57, after which air supply is shut off from the handgrip motor.

Pressurised air is then fed into the cylinders 51 and 52 through the air lines 53 and 54, to move the pistons 48 and 49 rearwardly relative to the forward end of the housing A. That movement allows the adjustor nut to enter the splined distal end 34 of the socket 20. Because the nut 28 may not line up perfectly with the splined opening 34 of the socket 20, the socket 20 can be rotated first in one direction and then in the other to ensure proper receipt of the nut 28.

Figure 5:
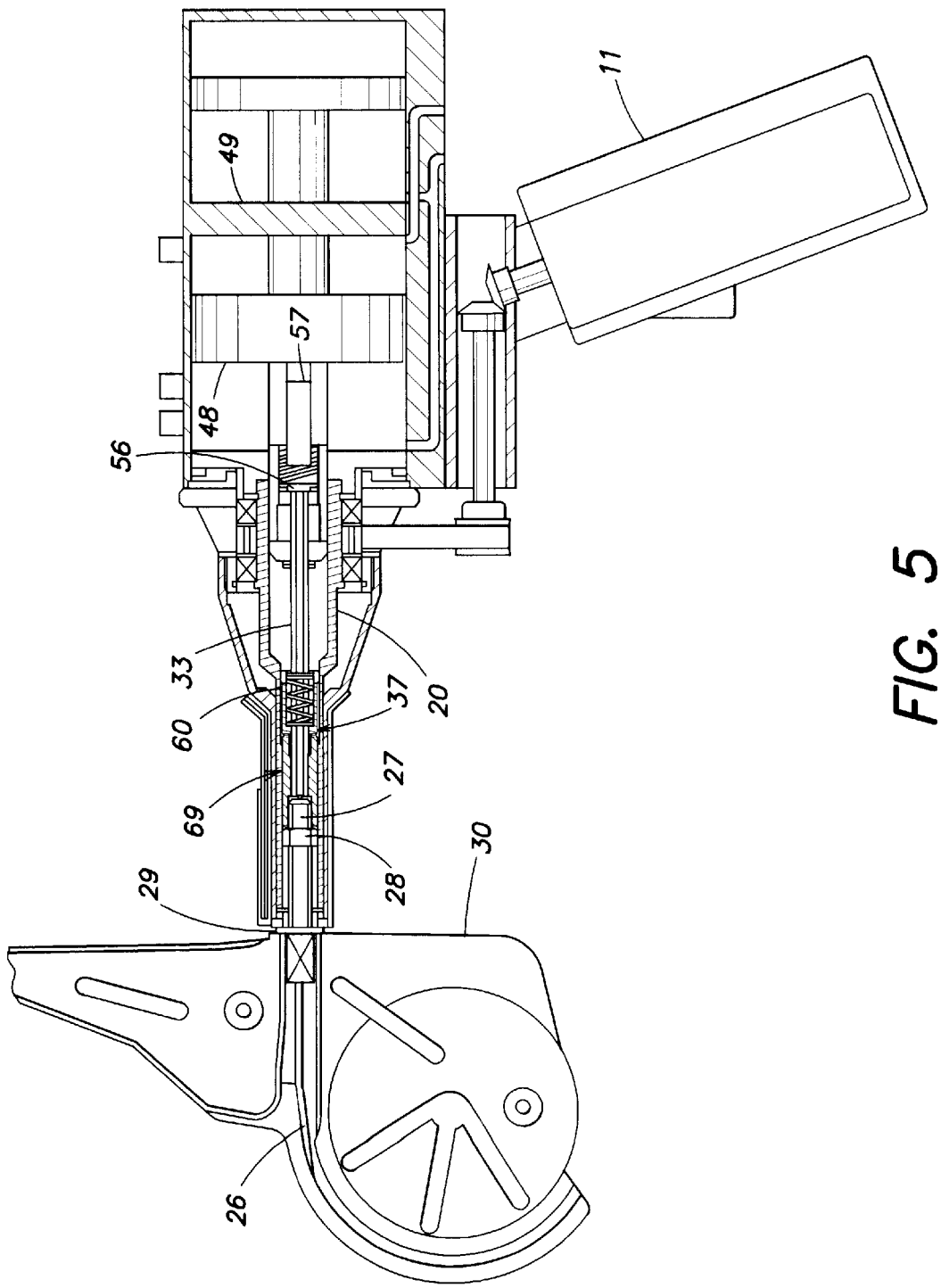
FIG. 5 is a cross-sectional view of the device according to FIGS. 1, 3 and 4 applied to the handbrake of FIG. 2.

When the nut 28 has been received within the end of the socket 20, a second sensor 58B situated at the nose of the tool initiates increased supply of pressurised air to the cylinders 51 and 52 through the air lines 53 and 54, such as to lift or draw the adjustor thread 27 and the adjustor nut 28 further into the socket 20 and as such, apply a tensile bedding load to the handbrake cable 26. FIG. 5 shows the device 10 attached to the handbrake and with the pistons 48 and 49 retracted rearwardly from the forward end 24 of the housing 14, so that the adjuster thread 27 and the adjuster nut 28 have been retracted into the socket 20. It is to be noted that the free end of the casing 25 is seated against the washer 29 and under load, the device 10 is firmly held against the handbrake without the need for further support.

The tensile load applied to the cable 26 is greater than the load which would normally be applied to the cable under normal operating conditions of the handbrake and that load causes the cable 26 to stretch, the handbrake casing to compress and the various components forming or connected to the handbrake to properly bed and seat.

After a predetermined load and time, the pressurised air in the cylinders 51 and 52 is released and the pistons 48 and 49 return to, or toward the home position. In some circumstances it may not be desirable to fully unload the cable by returning the pistons to the home position and therefore, some pressurised air may be retained in each cylinder so that the load is not fully removed.

The device 10 can include a warning facility which sounds an alarm and automatically operates the tool in a manner to remove it form the handbrake. A sensor 58, is used to monitor the position of the piston 48, and during normal use the sensor 58 should not sense the presence of piston 48. If for example the adjuster thread 22 is drawn into the device more than normal, such as because the handbrake cable has been incorrectly installed during assembly, the piston 48 may travel further rearward than normal, triggering the sensor 58 and in turn sounding the alarm and commencing removal of the tool from the handbrake assembly.

Figure 4D:
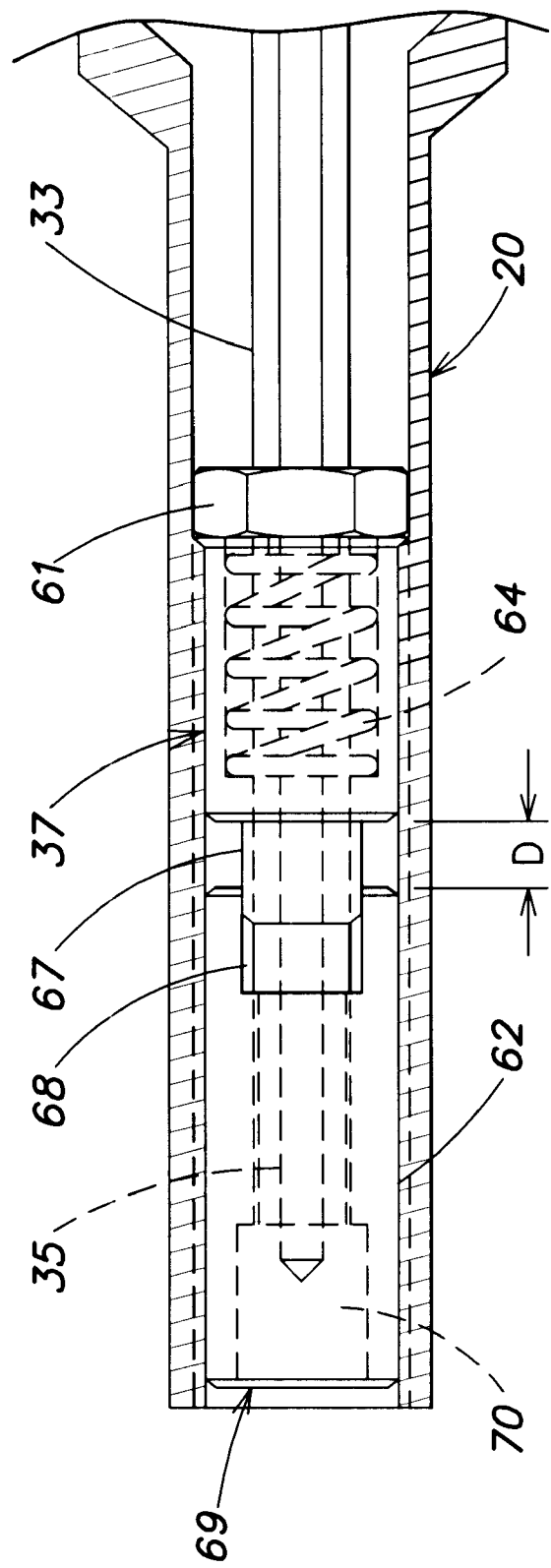

The application and release of pressurised air to/from the respective cylinders 51 and 42 represents a single cycle load of the device 10. More than a single cycle would normally be applied to the handbrake and, therefore, the cycle can simply be repeated as necessary, varying the load and/or period of load application, if necessary, as appropriate. When the number of cycles is complete, a set load is applied to the cable in the same manner that the earlier load or loads were applied, but this load represents the load at which the handbrake is to be set. Having applied that setting load, pressurised air is supplied to the handgrip motor to drive the socket 20 in the same direction as it was driven when the device 10 was applied to the adjustor thread 27. However, the shift of the draw bar 33 from the FIG. 4B position to the FIG. 4C position withdraws the hexagonal head 61 of the drive nut 37 from the splined section 62 of the socket 20, so that rotation of the socket 20 applies no rotational movement to the drive nut 37 nor consequently to the threaded head 69. The adjustor nut 28 however is rotated by the socket 20 and runs down the adjustor thread 27. When the nut 27 reaches the washer 29, sensors initiate disconnection of the pressurised air supply to the handgrip motor and rotation of the socket 20 stops. Pressure is then reversed in the cylinders 51 and 52 and the pistons 48 and 49 return to their home position to release the nut 28 from within the socket 20. The draw bar is also moved to the home position of FIG. 4B, so that the threaded head 69 assumes the position shown in that drawing. The hexagonal head 61 may not align perfectly with the splined section 62 of the socket 20 for immediate receipt therein, and FIG. 4D illustrates, that in that circumstance, the drive nut 37 will be separated the small distance D from the threaded head 69. That separation is not sufficient to disengage the blade 67 from the slotted end 68 and upon the commencement of further rotation of the socket 20, the return spring 64 will cause the head 61 to enter the splined section 62. Sensors sense the return of the pistons to the home position and initiate supply of pressurised air to the handgrip motor to drive the motor, and therefore the socket 20, in the reverse direction to that which it has already been driven. In that direction, and with the head 61 received within the splined section 62, the threaded head is forced to rotate and release the adjuster thread 27 from within the recess 70. The process is now complete and the device 10 can be removed from the handbrake.

Figure 2A:
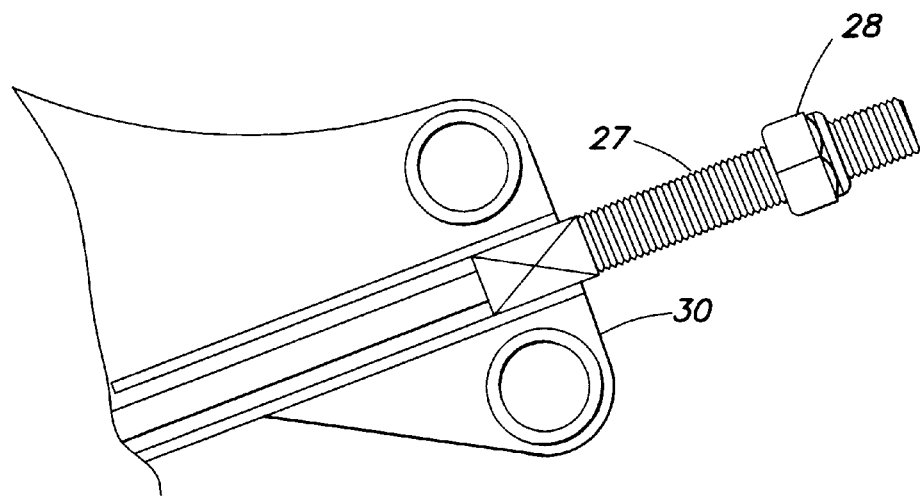
FIGS. 2A and 2B show the mechanism of adjuster thread movement during a handbrake setting operation.
Figure 2B:
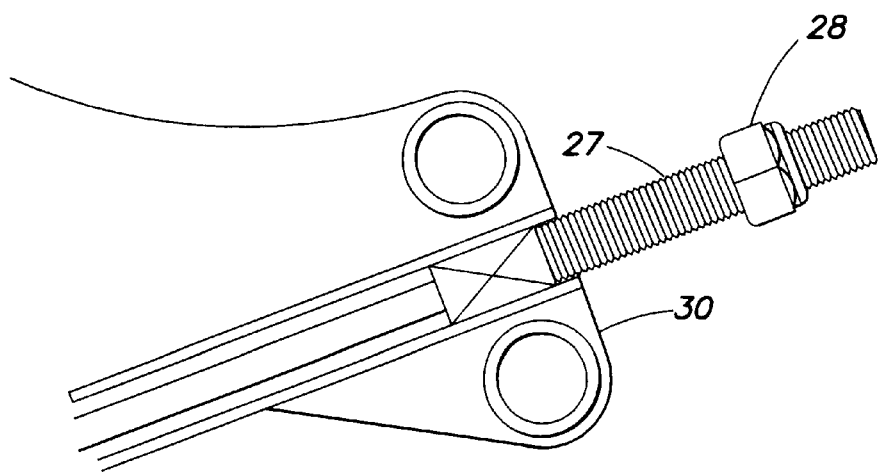

The device 10 may include a further sensor to sense the retracted position of the pistons in the part of the cycle in which the adjuster nut is run down the adjuster thread. If the pistons retract during the cycle movement beyond a certain maximum retraction, the adjuster thread may have been fully lifted above the upper surface 30 of the handbrake frame, so preventing the adjuster the nut from threading down against the washer 29 in a seated position. FIG. 2A shows the adjuster thread 27 lifted proud of the frame surface 30, such what when the nut 28 is threaded downwardly on the adjuster thread 27, it runs out of thread before it can seat against the surface 30. FIG. 2B shows the adjuster thread lifted, but only so far as to leave several threads below the seating surface 30 of the frame, so that the nut 28 can be threaded down the adjuster thread 27 to seat against that surface.

The invention has provided impressive results in relation to improved handbrake setting and the following text and tables A, B and C, represent a comparison between a current manual setting method and the method according to the invention, as applied by a device substantially as described in relation to FIGS. 1 to 5. The trial was carried out on a handbrake suitable for a Rover 800 car.

Current Manual Setting Method

1. A new set of rear cables was fitted to the test rig.
2. The front handbrake cable was attached to a tensile load measuring cell and this in turn was attached to an equaliser, which is disposed between the two rear handbrake cables extending from each rear brake, and the cable which extends from the handbrake, and the digital readout of the load measuring cell was then set to zero.
3. The handbrake was set in the "off" position and the adjuster nut was positioned with a digital vernier 18 mm down from the top end of the adjuster thread to the top of the adjuster nut.
4. The handbrake was then positioned to the 4 th 'click' (this being the 4th ratchet 'click' when the handbrake is applied) and the recorded load is identified in Table A under Application No. 1.
5. The handbrake was then released and then returned to the 4th 'click' with the recorded load identified in Application No. 2. This process was repeated to the tenth handbrake application.
6. After the tenth reading was taken, instead of releasing the handbrake it was applied to the 8th 'click' (approximately 240 kg), and then returned to the "off" position.
7. The handbrake was then applied to the 4th 'click' and the recorded load is identified in Application No. 11.
8. The rear cables were then removed, the adjuster nut was returned to the start of the thread and then a new set of rear cables were fitted. This procedure was then repeated for a further six sets of cables, (A, B, C, D, E, F & G).

TABLE A

| CABLE NO. | HANDBRAKE APPLICATION NUMBER | | | | | | | | | | |
|---|---|---|---|---|---|---|---|---|---|---|---|
| | 1 | 2 | 3 | 4 | 5 | 6 | 7 | 8 | 9 | 10 | 11 |
| A | 135 | 134 | 131 | 130.5 | 129 | 128 | 128.5 | 127 | 123 | 126 | 118 |
| B | 160 | 157 | 155 | 154 | 151.5 | 150 | 149 | 148 | 149.5 | 14 | 132 |
| C | 164 | 162 | 157.5 | 155 | 152 | 155 | 152 | 152 | 151 | 150 | 135 |
| D | 154.5 | 151.5 | 151 | 150.5 | 145.5 | 146.5 | 145 | 142 | 141.5 | 141 | 122 |
| E | 120 | 121 | 112.5 | 119 | 117.5 | 116.5 | 117.5 | 115.5 | 115 | 115 | 110.5 |
| F | 135 | 131.5 | 130 | 129 | 128.5 | 127 | 125 | 125.5 | 125 | 122.5 | 116 |
| G | 140 | 138.5 | 136.5 | 136.5 | 134 | 135 | 133.5 | 133 | 129 | 130 | 120 |
| MAX VARI. | 44 | 41 | 45 | 36 | 34.5 | 38.5 | 34.5 | 36.5 | 36 | 35 | 24.5 |
| AVERAGE | 144.0 | 142.2 | 139.0 | 139.2 | 136.8 | 136.8 | 135.7 | 134.7 | 133.4 | 133.3 | 121.9 |

Setting Method According to the Invention

1. A normal handbrake adjuster nut (a flanged nut) was removed and replaced with a nylock nut and washer, which is mandatory for this arrangement. The nut was positioned 10 mm down from the top of the thread to the top of the nut.

2. The handbrake used on the Current Manual Setting Method test was removed and replaced with a new handbrake.

3. A new set of rear cables were fitted in the test rig.

4. The handbrake was placed in the "off" position, and the front cable attached to the load cell which in turn was attached to the equaliser. The digital readout was then set to zero.

5. The 'set load' (load required in the cable with the handbrake in the 4th click), was adjusted as indicated by a pressure gauge to 4 bar. This load may vary depending on the handbrake being set.

6. The handbrake was positioned to the 4th click and the setting device was applied.

7. Four bedding load applications and one set load application were applied to the handbrake. Table C shows the value of the four bedding loads and also indicates a PHST Set load and an Actual Set load. The PHST Set load is the load which is applied to the handbrake cable by the setting device, prior to positioning the adjuster nut down the adjuster thread. The Actual Set load is the load of the handbrake after the adjuster nut has been set and the setting device been removed.

There is a variation between these two loads, however the proposed use of an optical nut positioning system is envisaged to remove that variation. This system is referred to later in this specification.

8. The handbrake setting load was then applied to the cable and while holding this load the nut was run down adjuster thread for positioning against the washer.

9. The setting device set load is indicated by the readout as shown in Table C under 'Actual Set' column.

10. The setting device was then returned to the start or home position and was removed.

11. The load indicated by the readout was noted under the "Actual Set" column.

12. The handbrake was then released and applied to the 4th 'click' and the recorded load is identified under Table B Application No. 1.

13. The distance from the top of the thread to the top of the nut was measured with a digital vernier and noted under 'Dist 'A'. With the handbrake set in a particular position and a specified load set in the cable on a number of vehicles, the distance "A" indicates the tolerance variation of the assembled components that are used in the handbrake system. This information is useful to the manufacturer for such reasons as how long to make the adjuster thread to cope with the tolerance variation of the handbrake components.

14. The handbrake was then released and re-applied to the 4th 'click;' the load recorded is indicated under Table B Application No. 2.

15. This procedure was repeated up to the tenth application.

16. After the tenth reading was taken, instead of releasing the handbrake it was applied to the 8th 'click' (approximately 240 kg) and then returned to its off position.

17. The handbrake was then applied to the 4th 'click' and the load recorded is identified under Table B, Application No. 11.

18. This procedure was applied to all seven sets of cables (1, 2, 3, 4, 5, 6 & 7).

TABLE B

| CABLE NO. | HANDBRAKE APPLICATION NUMBER | | | | | | | | | | |
|---|---|---|---|---|---|---|---|---|---|---|---|
| | 1 | 2 | 3 | 4 | 5 | 6 | 7 | 8 | 9 | 10 | 11 |
| A | 117 | 117.5 | 118.5 | 118.5 | 118 | 118 | 118 | 117 | 117 | 117 | 114 |
| B | 116 | 116.5 | 116 | 116.5 | 116.5 | 116 | 116 | 116 | 115 | 115 | 114 |
| C | 116 | 116.5 | 117 | 117 | 117 | 116 | 117 | 117 | 117.5 | 115.5 | 114.5 |
| D | 117 | 118 | 117.5 | 118 | 118.5 | 118.5 | 118.5 | 118.5 | 118.5 | 118 | 117 |
| E | 114 | 114 | 115 | 115.5 | 115 | 114.5 | 113.5 | 115 | 115 | 115 | 114 |
| F | 119 | 119 | 120 | 120 | 119 | 119 | 120 | 117 | 118 | 119 | 117 |
| G | 115 | 115 | 116.5 | 115.5 | 118 | 116.5 | 116 | 115 | 117 | 117 | 114 |
| MAX VARI. | 3.5 | 3.5 | 4 | 4.5 | 4 | 4.5 | 6.5 | 3.5 | 3.5 | 3.5 | 3 |
| AVERAGE | 19.27 | 116.3 | 117.2 | 117.2 | 117.4 | 117.0 | 116.8 | 116.5 | 116.8 | 116.6 | 114.9 |

TABLE C

| CABLE NO. | APPLIED BEDDING LOADS | | | | *PHST SET | ACTUAL SET |
|---|---|---|---|---|---|---|
| | 1 | 2 | 3 | 4 | 5 | 6 |
| A | 388 | 385 | 379 | 382 | 188 | 106 |
| B | 390 | 385 | 379 | 386 | 189 | 105 |
| C | 386 | 382 | 378 | 389 | 187 | 103 |
| D | 378 | 375 | 386 | 383 | 188 | 104 |
| E | 387 | 386 | 374 | 382 | 185.5 | 103 |
| F | 372 | 378 | 382 | 381 | 182 | 102 |
| G | 373 | 379 | 386 | 376 | 188 | 107 |

*PHST stands for Pneumatic Hydraulic Setting Tool, which is a tool according to the invention.

Figure 6:
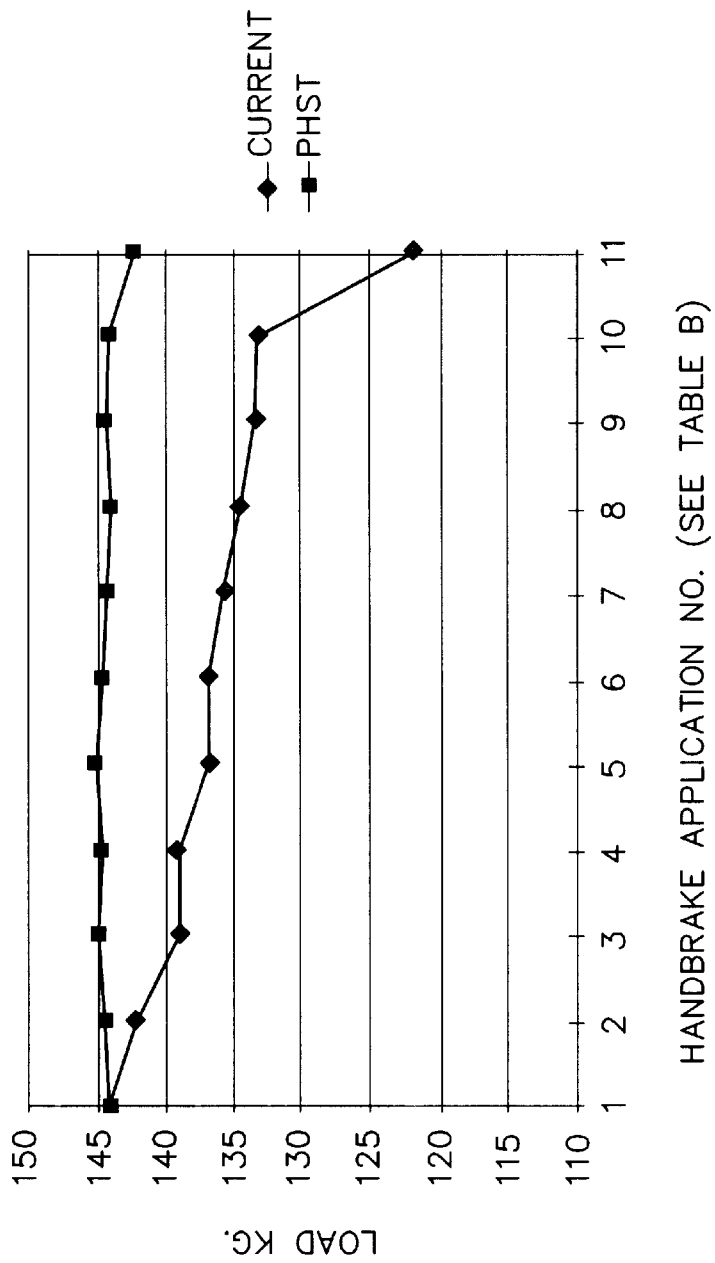
FIG. 6 is a table, labeled Table D, of load (in kilograms) versus handbrake application no. as set forth in Table B.

A graphical comparison of the test results is found in Table D shown in FIG. 6.

From the above graph, it can be seen that the maximum variation in applied load is significantly reduced by the method of invention and is in the order of a factor of 10. However, further improved results are envisaged by the use of an optical nut positioning system which is presently being developed. That system will be positioned adjacent the distal end 34 of device 10 shown in FIG. 1 and will sense the presence of the adjuster nut when it is being set against the handbrake frame 30 (FIG. 2). Without the optical system, the device 10 rotates the nut 28 until it exits the recess 70 of the threaded head 69, but that may not position the nut fully against the washer 29. That is because the thickness of nuts may vary from nut to nut and a nut that is, for example, ½ mm less thick will be positioned ½ mm away from the washer, because the downward travel of the socket 33 is set and therefore it cannot compensate for thickness variation. That accounts for the variation between the PHST Set and Actual Set loads of Table C. If the nut is set ½ mm above the washer, when the device is removed from the handbrake, the nut will move to engage the washer, so moving ½ mm and reducing tension in the handbrake cable. The Actual Set load is therefore lower than the PHST Set load.

With an optical system, the optical sensor sense the position of the nut relative to the washer and causes downward travel of the socket until the nut fully engages the washer. Thus, the nut is set against the washer regardless of thickness variation and the PHST Set load and the Actual Set load will be substantially the same.

As will be apparent from the above, the invention provides a significant advantage over present handbrake setting methods, in that the early appearance of slack due to handbrake bedding and cable stretch is substantially eliminated. Thus, the handbrake does not require early adjustment and the previous expense to the manufacturer for that service is avoided.

The invention described herein is susceptible to variations, modifications and/or additions other than those specifically described and it is to be understood that the invention includes all such variations, modifications and/or additions which fall within the spirit and scope of the above description.

What is claimed is:

1. A device for setting the handbrake cable of an automotive handbrake, said handbrake cable including a threaded member fixed at one end and a nut threaded onto said member and in the set condition of the handbrake said nut engaging against a seat to maintain tension in said handbrake cable, said device including gripping means to grip said threaded member and retracting means to retract said gripping means to a retracted position to apply a tensile bedding load to said cable which bedding load exceeds the required set load of the cable in the set condition, return means to return said threaded member from said retracted position to reduce the tensile load on said cable to said set load, rotating means to rotate said nut down said threaded member to engage said seat whereafter said gripping means is arranged to release said threaded member, and said gripping means including a drive head having an internally threaded recess for threadably engaging said threaded member, said drive head being rotatable relative to said threaded member by drive means for threadabiy engaging said threaded member.

2. A device according to claim 1, said gripping means including a drive head having an internally threaded recess for threadably engaging said threaded member, said drive head being rotatable relative to said threaded member by drive means for threadably engaging said threaded member.

3. A device according to claim 1, said drive means including a rotatable socket for driving said drive head.

4. A device according to claim 3, said drive means including a drive nut which is engagable by said drive socket for rotating said drive nut, said drive nut cooperating with said drive head to drive said drive head.

5. A device according to claim 4, said drive nut including a socket engaging end remote from said drive head, and cooperating means for cooperating with said drive head opposite said socket engaging end, said drive nut being movable axially so that said socket engaging end can move axially relative to said socket from a socket engaged position, in which rotation of said socket causes rotation of said drive nut, and a socket disengaged position in which said nut is not caused to rotate upon rotation of said socket.

6. A device according to claim 5, said socket engaging end having an hexagonal edge periphery and said socket including an internal bore suitable to engage said edge periphery in a first section thereof, and in a second section thereof, to be disengaged from said edge periphery, said first and second sections being axially aligned.

7. A device according to claim 5, said cooperating means remaining in cooperation when said drive nut is in either of said socket engaged or said socket disengaged positions.

8. A device according to claim 4, said rotating means for rotating said nut being provided on an internal bore of said rotatable socket, said socket being arranged to engage said nut and to accommodate said nut within said internal bore upon retraction of said threaded member by said gripping means, said internal bore being shaped to facilitate rotation of said nut down said threaded member to engage said seat.

9. A device according to claim 1, said device including a piston/cylinder arrangement which is arranged to displace under pneumatic or hydraulic pressure, a drawbar to which said gripping means is attached, between said retracted and said return positions.

10. A device according to claim 9, said retracting means being operable to displace said piston to retract said gripping means and apply a bedding load to said handbrake cable and said return means being operable to displace said piston to return said gripping means to at least partly reduce the load on said handbrake cable.

11. A device according to claim 9, said piston cylinder arrangement including a pair of pistons connected in series.

12. An apparatus comprising the device according to claim(s) 1 and also having a handbrake cable.

13. A method of setting the handbrake cable of an automotive handbrake, said handbrake cable including a threaded member fixed at one end and a nut threaded onto said member and in the set condition of the handbrake said nut engaging against a seat to maintain tension in said handbrake cable, said method including gripping said threaded member and retracting said member to apply a tensile bedding load to said cable, which bedding load exceeds the required set load of the cable in the set condition, returning said threaded member from the retracted position to reduce the tensile load on said cable to said set load, rotating said nut down said threaded member to engage said seat and releasing said threaded member, wherein said gripping of said threaded member includes threadably engaging said threaded member with an internally threaded recess of a drive head, said drive head being rotated relative to said threaded member by drive means for threadably engaging said threaded member.

14. A method according to claim 13, including applying and releasing, at least partially, said bedding load at least twice, prior to reducing said load to said set load and rotating said nut to engage said seat.

15. A method according to claim 13, wherein said threaded member is retracted and returned a plurality of times to apply more than a single bedding load.

16. The apparatus of claim(s) 13, in which the cable is set.

* * * * *

UNITED STATES PATENT AND TRADEMARK OFFICE
CERTIFICATE OF CORRECTION

PATENT NO. : 6,575,270 B2
DATED : June 10, 2003
INVENTOR(S) : Steven Farenden

It is certified that error appears in the above-identified patent and that said Letters Patent is hereby corrected as shown below:

<u>Title page,</u>
Item [57], delete the ABSTRACT in its entirety and insert therefor -- The device includes a gripping member (69) to grip the threaded member (27) of a brake cable (26) and retracting members (48, 49) to retract the gripping member to a retracted position to apply a tensile bedding load to the cable, which exceeds the required set load of the cable the set condition. The retracting members also act to return the threaded member from the retracted position, to reduce the tensile load on the cable to the set load. Rotating members (20, 60) rotate the nut (28) down the threaded member to engage the seat (29) whereafter the gripping member releases the threaded member. --.

<u>Column 13,</u>
Line 39, "threadabiy" should read -- threadably --.
Lines 41-45, delete the claim in its entirety.

<u>Column 14,</u>
Line 2, "an hexagonal" should read -- a hexagonal --.
Lines 32 and 58, "claim(s)" should read -- claim --.
Line 58, "apparatus" should read -- method --.

Signed and Sealed this

Twenty-third Day of September, 2003

JAMES E. ROGAN
*Director of the United States Patent and Trademark Office*